(12) United States Patent
Rottner et al.

(10) Patent No.: US 9,052,397 B2
(45) Date of Patent: Jun. 9, 2015

(54) METHOD OF DEPOSITING BORON ON SHEET METAL FOR NEUTRON DETECTION APPARATUS OR IONIZATION CHAMBER

(75) Inventors: Bernard Rottner, Marseilles (FR); Stanislas Partyka, Clapiers (FR)

(73) Assignee: O.T.N.D.—ONET TECHNOLOGIES NUCLEAR DECOMMISSIONING, Marseilles (FR)

( * ) Notice: Subject to any disclaimer, the term of this patent is extended or adjusted under 35 U.S.C. 154(b) by 0 days.

(21) Appl. No.: 14/117,148

(22) PCT Filed: Apr. 19, 2012

(86) PCT No.: PCT/EP2012/057164
§ 371 (c)(1),
(2), (4) Date: Dec. 3, 2013

(87) PCT Pub. No.: WO2012/152558
PCT Pub. Date: Nov. 15, 2012

(65) Prior Publication Data
US 2014/0103221 A1    Apr. 17, 2014

(30) Foreign Application Priority Data
May 12, 2011 (FR) ..................... 11 54134

(51) Int. Cl.
*H01J 47/00*   (2006.01)
*G01T 3/00*    (2006.01)
*C01B 35/02*   (2006.01)

(52) U.S. Cl.
CPC .............. *G01T 3/00* (2013.01); *C01B 35/023* (2013.01); *G01T 3/008* (2013.01)

(58) Field of Classification Search
CPC .............. G01T 3/00; G01T 1/16; G01T 1/18; G01T 1/185; G01T 3/008; H01J 47/12; B82Y 30/00; B82Y 15/00
USPC .......... 250/374, 269.1–269.8, 390.01–390.12
See application file for complete search history.

(56) References Cited

U.S. PATENT DOCUMENTS

| | | | |
|---|---|---|---|
| 6,426,504 B1 * | 7/2002 | Menlove et al. ......... | 250/390.01 |
| 6,630,100 B1 | 10/2003 | Murakami et al. | |
| 7,909,907 B1 * | 3/2011 | Ripley et al. .................... | 75/343 |
| 2003/0213917 A1 | 11/2003 | Menlove | |
| 2010/0314549 A1 | 12/2010 | Wang et al. | |

FOREIGN PATENT DOCUMENTS

DE 102004003399  8/2005
EP 1249844  10/2002

OTHER PUBLICATIONS

International Search Report from corresponding PCT application No. PCT/FR2012/057164.
Oyaidzu, M. et al., "Preparation of Pure Boron Coating Film and its Characterization by XPS and TDS," Applied Surface Science, Elsevier, Amsterdam, NL, vol. 244, No. 1-4, ISSN: 0169-4332, DOI: 10.1016/J.APSUSC.2004.10.133. Abstract Only.

* cited by examiner

*Primary Examiner* — Kiho Kim
(74) *Attorney, Agent, or Firm* — Lowe Hauptman & Ham, LLP

(57) ABSTRACT

The invention is a method of depositing a solid layer (1) of boron on a metal support (2, 3) intended for a neutron detection apparatus (0) characterized in that it comprises at least one step of depositing at least one layer (1) comprising boron on the metal support (2, 3) and a step of cold-pressing of the metal support (2, 3) with the layer (1) comprising boron.

15 Claims, 1 Drawing Sheet

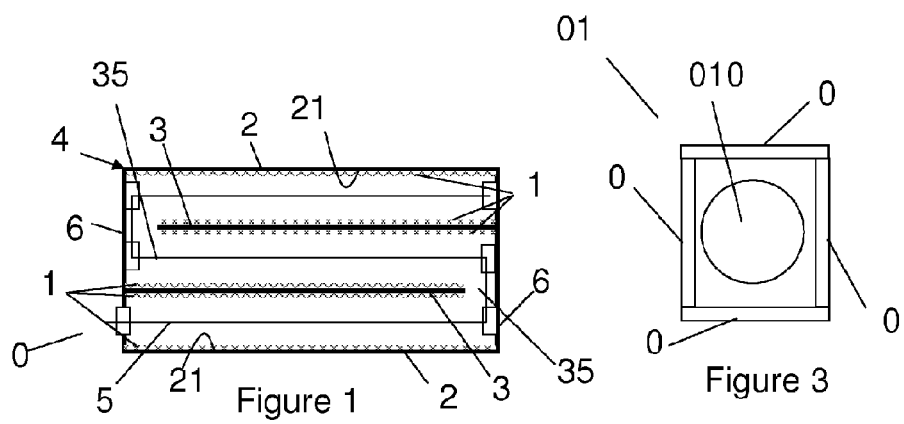
Figure 1
Figure 3
Figure 2a
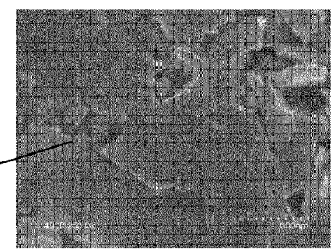
Figure 2b

METHOD OF DEPOSITING BORON ON SHEET METAL FOR NEUTRON DETECTION APPARATUS OR IONIZATION CHAMBER

FIELD

The present invention relates to the field of detection apparatus, more particularly a method of depositing a solid layer of boron on a metal support for a neutron detection apparatus. This method is also advantageous for ionization chambers.

BACKGROUND

The document published under the number FR 2960303 describes one such neutron detection apparatus. Said detection apparatus comprises an enclosure forming a cathode filled with gas and comprising a hollow body. Said hollow body comprises two main walls joined together by lateral walls and having two substantially parallel internal surfaces and covered by a solid layer containing boron or a compound of boron. A device forming an anode extends inside the enclosure. Said apparatus also comprises at least one intercalary wall forming a cathode fixed on the lateral walls and extending inside the enclosure substantially parallel to the internal surfaces of the hollow body. The or each intercalary wall receives a solid layer containing boron or a compound of boron.

The method for making the solid layer of boron proposed by the document is the depositing or projecting of a boronated suspension, also called boron nanoparticle-based ink, onto the supports whose surfaces must be covered by a solid layer of boron. The support is heated beforehand so that the ink dries immediately without having time to run laterally. Furthermore, a surfactant is mixed with the ink to ensure a homogeneous deposit and to improve the adhesion of nanoparticles on the surface of the support. However, this method does not guarantee homogeneity of the thickness of the solid layer of boron nor satisfactory fixing of said layer. Indeed, if for example the ink does not dry rather quickly, the thickness of the layer on the bottommost part of the support in relation to the ground during drying will be greater than on the uppermost part. A perfectly horizontal position of the support might be a solution, but it will nevertheless be necessary to add surfactant in proportions of 30% to 40% to ensure that the nanoparticles adhere to the support. The addition of this surfactant reduces the efficacy of the layer of boron and thus of the detection apparatus.

Other methods of depositing a solid layer of boron exist, such as cathode sputtering, vapor phase deposition, or deposition by thermal dissociation of boranes. But, the cathode sputtering method requires long treatment times and the layer obtained is not stable and disintegrates easily. The vapor-phase deposition method requires very high temperatures in the vicinity of the vaporization temperature of boron, about 3927° C. The deposition method using thermal dissociation of boranes requires the use of gases that are both explosive and toxic. Furthermore, this deposition method and the vapor-phase deposition method are costly because they require the use of 3 g to 5 g of boron 10 ($^{10}$B) per gram deposited. However, $^{10}$B is very expensive and a neutron detection apparatus needs about 50 g of $^{10}$B deposited.

The deposition of a solid layer of boron is thus a tricky point in the manufacture of a neutron detection apparatus. In order for the apparatus to have satisfactory efficacy, the layers of boron are essentially composed of $^{10}$B of controlled thickness of between 0.03 mg/cm$^2$ and 0.5 mg/cm$^2$. The density of natural boron is 2.34 and that of $^{10}$B is slightly lower and equal to 2.16. A value of 0.1 mg/cm$^2$ thus corresponds to a thickness of 460 nm and 0.4 mg/cm$^2$ to 1850 nm. The thickness must be controlled within about 20%. Furthermore, the proportion of $^{10}$B in the layer must be as close as possible to 100%, which not only imposes the use of $^{10}$B enriched boron but also strongly limits the use of additives such as surfactants, dispersants or adhesives.

SUMMARY

The present invention aims to mitigate one or more disadvantages of the prior art by proposing a deposition method that is inexpensive, relatively safe, easy to implement, and effective.

To this end, the invention relates to a method of depositing a solid layer of boron on a metal support intended for a neutron detection apparatus or an ionization chamber characterized in that the method comprises at least one step of depositing at least one layer comprising boron in the form of nanoparticles on the metal support and a step of cold pressing the metal support with the boron-comprising layer, the proportion of boron 10 ($^{10}$B) in the layer deposited on the metal support being between 80% and 100%.

According to another characteristic, the deposition step is preceded by a step of prepressing the metal support.

According to another characteristic, the step of depositing at least one boron comprising layer (1) on the metal support (2, 3) is a step of depositing boron nanoparticle (BNP)-based ink onto the metal support (2, 3); the step of depositing BNP-based ink onto the metal support (2, 3) being followed by a step of drying the metal support (2, 3) on which ink was deposited to leave only the BNP and the dispersant on the metal support (2, 3);

the step of cold pressing the metal support (2, 3) is carried out on the metal support (2, 3) with the BNP and the dispersant left on the metal support (2, 3); the step of cold pressing the metal support (2, 3) with the boron comprising layer (1) being optionally preceded or followed by a step of cooking the metal support (2, 3) in order to evaporate water fixed in the pores of the BNP and to incinerate or calcine the dispersant.

According to another characteristic, the BNP-based ink is manufactured by at least:
a step of manufacturing BNP;
a step of suspending BNP in a solvent containing a dispersant mixture.

According to another characteristic, the concentration of the dispersant mixture in the ink is lower than 0.05%, and this dispersant mixture comprises a cationic polar head and an associative polymer.

According to another characteristic, the concentration of BNP in the ink is lower than 5%.

According to another characteristic, the step of depositing BNP-based ink onto the metal support is carried out with a brush, the thickness of the deposit being dependent on the concentration of BNP in the ink and the quantity of ink, this quantity being defined according to the surface area of the metal support to be covered by the ink deposit.

According to another characteristic, the step of depositing BNP based ink onto the metal support is carried out by projecting a jet of ink, the thickness of the deposit being dependent on the concentration of BNP in the ink, the flow rate of the jet, the size of the jet, and the relative sweep rate of the jet.

According to another characteristic, the deposition of ink onto the metal support is carried out by a deposition method using dipping wherein the metal support is dipped in ink, the ink optionally including a binder intended to promote the adhesion of BNP on the metal support and/or a thickener intended to adjust the viscosity of the ink.

According to another characteristic, the deposition of ink onto the metal support is carried out by a method of spreading with a bar.

According to another characteristic, the step of depositing at least one boron comprising layer (1) is preceded by a step of cleaning the metal support in order to remove possible residues using specific surfactant products.

According to another characteristic, the metal support is an aluminum sheet.

The invention also relates to a neutron detection apparatus of the proportional gas counter or ionization chamber type characterized in that it comprises at least one enclosure forming a cathode, said enclosure being filled with gas and comprising a hollow body comprising two main walls having respectively two substantially parallel internal surfaces and each covered by a solid layer of boron or a compound of boron obtained by cold pressing, the apparatus further comprising a device forming an anode extending inside said enclosure.

According to another characteristic, the apparatus further comprises one or more intercalary walls forming a cathode, fixed on said lateral walls and extending inside said enclosure in a manner substantially parallel to the internal surfaces of the hollow body, the or each intercalary wall having two opposite surfaces opposite the respective internal surfaces of the two main walls of the hollow body and each covered by a solid layer containing boron or a compound of boron obtained by cold pressing, the device forming an anode having at least one part extending into a space between the intercalary wall and one of the internal surfaces of a first main wall of the hollow body and at least one other part extending into another space between the intercalary wall and the other internal surface of the second main wall of the hollow body.

The invention also relates to a neutron detection device useful for detecting neutrons emitted by a voluminous object such as a barrel of radioactive waste comprising a plurality of detection apparatus according to the invention, the plurality of detection apparatus delimiting a large cavity inside which a voluminous object can be disposed.

BRIEF DESCRIPTIONS OF DRAWINGS

Other characteristics and advantages of the present invention will become more readily apparent upon further reading of the description and reference to the accompanying drawings:

FIG. 1 represents a cross-sectional view of the neutron detection apparatus;

FIG. 2a represents a photograph of the boron layer before the cold-pressing step;

FIG. 2b represents a photograph of the boron layer after the cold-pressing step;

FIG. 3 represents schematically a neutron detection device made from neutron detection apparatus according to one configuration.

DETAILED DESCRIPTION

The invention will be described in reference to the drawings listed above.

The present invention proposes a method of depositing a solid layer (1) of boron on a metal support (2, 3) intended for a neutron detection apparatus (0). Said method can also be applicable to the walls of an ionization chamber.

Said method comprises at least one step of depositing at least one boron comprising layer (1) onto the metal support (2, 3) and a step of cold pressing the metal support (2, 3) with the boron-comprising layer (1). The boron of the layer of boron is preferably boron 10 in a mass proportion of between 90% and 100%, preferably between 99% and 100%, which makes it possible to obtain mass proportions of boron 10 for the deposition of greater than 80%, even 90%.

In one configuration, in order to be sure to have a metal support (2, 3) of smooth surface and constant thickness, the deposition step can be preceded by a step of prepressing the metal support (2, 3).

In another configuration, prepressing makes it possible to compensate for possible imperfections of the pressing device by imposing, before the deposition of the boron-comprising layer(s) (1), a distortion of the support matching these imperfections.

The metal support (2, 3) is, for example, a sheet of aluminum or of soft metal alloy or of soft metal such as copper, gold, silver, tin, platinum, lead, zinc, iron or nickel. The method can also be applied for plastic supports.

The step of depositing at least one boron comprising layer (1) onto the metal support (2, 3) is a step of depositing boron nanoparticle (BNP)-based ink onto the metal support (2, 3).

Said step of depositing at least one boron comprising layer (1) can optionally be preceded by a step of cleaning the metal support (2, 3) to remove possible residues using specific surfactant products. Indeed, metal supports such as aluminum sheets are generally manufactured by cold rolling, which is favorable to the deposition method because it provides the support with a very smooth surface and homogeneous thickness. However, during rolling, the support is often protected by an adhesive plastic film. Adhesive residues are quite a nuisance and prevent a homogeneous deposit. Furthermore, they adhere to the surface more strongly and are difficult to remove. It is thus necessary either to provide a metal support (2, 3) without adhesive or to remove adhesive residues by, for example, a thermal treatment at 350° C. for at least 2 hours, or plunging in 3 M soda solution for 30 seconds, or plunging in bleach for 15 minutes, or plunging in a degreasing solution or specific surfactant products, for example aromatic-free petroleum, or rubbing the surface to be cleaned with a cloth impregnated with this same degreasing solution.

BNP based ink is manufactured by several steps including at least a step of manufacturing BNP and a step of suspending BNP in a solvent containing a dispersant.

The maximum content of BNP is, for example, 5%. Advantageously, the dispersant is a mixture of a cationic head, for example phenyl-trimethyl-ammonium bromide (supplied by "Fluka") and an associative polymer, for example polyacrylate grafted with alkyl chains of a molecular weight of 750,000 and length of 30 Å (supplied by "Coatex", item RSY 15031), in a total concentration in the ink of lower than 0.05%.

The BNP size must be smaller than the thickness of the deposit. Thus, it is less than 460 nm for a 0.1 mg/cm$^2$ deposit.

The BNP are manufactured according to a method which comprises at least the following steps:

a step of synthesizing a lithium/boron (LiB) compound under inert atmosphere or under vacuum at a temperature of about 650° C.;

a step of hydrolyzing the LiB compound in distilled water bath subjected to ultrasound;

a step of separating the BNP from other products resulting from hydrolysis of the LiB compound by, for example, at least tangential filtration.

The hydrolysis step is carried out in a distilled water bath subjected to ultrasound, also known as an ultrasonic bath. Said sonication uses ultrasound that, for example, can have frequencies of about 20 kHz and power of about at least 100 W per liter of solution, preferably 350 W/L. These values are not restrictive and can be changed in order to obtain a more effective sonication and thus to obtain BNP of smaller sizes.

The BNP obtained after the hydrolysis step have a diameter of about 300 nm. These BNP are porous with an estimated porosity of 50%. Thus, a diameter of 300 nm corresponds to a mass particle diameter of 150 nm.

After the hydrolysis step, the BNP are separated by tangential filtration. The solution obtained after hydrolysis is thus filtered through one or more tubular mineral membranes, for example, of length of 25 mm, of inner diameter of 8 mm and of effective membrane surface area of 40 cm$^2$. The or each membrane can be, for example, of alumina with a filtering layer of zirconium oxide of thickness of 15 μm. The solution obtained after each filtration can be rediluted in distilled water, then refiltered. In this way, 2 to 4 filtration passes can be carried out, for example. Filtration helps concentrate the BNP by a factor of about 20, without concentrating the lithium hydroxide (LiOH) that is a by-product of BNP synthesis. Dilution of the concentrate containing the BNP in distilled water decreases the concentration of lithium hydroxide by a factor of 20. Two passes of filtration/dilution in distilled water decrease the lithium hydroxide concentration by a factor of 400, three passes by a factor of 8000, four passes by a factor of 160,000, etc.

Tangential filtration is a so-called "off the shelf" technique belonging to the prior art. Nevertheless, it must be specified that its applications generally recover the water, which is purified by this method, and that the method must rather recover the concentrate, which contains the BNP. As a result, it is necessary to adapt the technique, notably by limiting the minimum volume of concentrate.

Optionally, the filtration step is followed by a step of mechanical crushing which makes it possible to obtain BNP of diameter of 100 nm. The mechanical crushing comprises at least:
  a step of drying the BNP by vacuum evaporation;
  a step of suspending the BNP in non-oxygenated solvent;
  a step of crushing the BNP in non-oxygenated solvent in a planetary mill;
  a step of drying the BNP by vacuum evaporation.

Mechanical crushing is an optional step which is most suited to deposits of low thickness. By mechanical crushing, BNP sizes of 100 nm can be achieved.

The non-oxygenated solvent used during the suspension step can be cyclohexane, for example. Said solvent is preferably non-oxygenated in order to avoid the oxidation of boron under the effect of strong local increases in temperature during crushing.

The BNP thus manufactured are suspended in a volatile solvent such as cyclohexane or water, solvent in which has been dissolved a low-concentration organic dispersant corresponding to less than 1% of the mass of boron. The role of this dispersant is to prevent the BNP from agglomerating.

Tests by the inventors showed that above a content of 6% in the ink, the BNP agglomerate, thus compromising the homogeneity of the deposit to be made. Therefore, ink with a BNP content of 5% was produced so as to minimize the proportion of dispersant in relation to the mass of BNP, the necessary concentration of dispersant in the ink depending little on the BNP content.

The inventors began by testing dispersant polymers of the polyacrylate type adopting a comb-shaped structure. Their tests showed that a content of about 10% (in relation to the mass of boron) was necessary. Then, they obtained a significant gain with a mixture of cationic surfactants (supplied by "Huntsman", Empigen Bac 50) at a content of 0.07% and an associative polymer, the polyacrylate grafted with alkyl chains of molecular weight of 750,000 and length of 30 Å (supplied by "Coatex", item RSY 15031) at a content of 0.03%, which is in total 2% dispersant in relation to the mass of boron. Lastly, they successfully tested the cationic head of the preceding surfactant (phenyl-trimethyl-ammonium bromide, supplied by "Fluka") at a very low content, 0.005%, and in mixture with the preceding associative polymer at a content of 0.025%, which is in total of 0.6% of dispersant in relation to the mass of boron.

The cationic heads bind to the BNP, negatively charged, which ensures their dispersion. The associative polymer creates a three-dimensional network in the ink, stabilizing the suspension.

The mixture thus obtained is a solution called BNP based ink.

The step of depositing the BNP-based ink onto the metal support (2, 3) is followed by a drying step, for example by vacuum heating the metal support (2, 3) on which the ink was deposited in order to leave only the BNP and the dispersant on the metal support (2, 3).

The deposition of BNP based ink onto the metal support (2, 3) can be carried out according to various methods.

In a first method, the deposition is carried out with a brush. In this case, the thickness of the deposit is dependent on the concentration of BNP in the ink and the quantity of ink, this quantity being defined according to the surface area of the metal support (2, 3) to be covered by the deposition of ink.

For a deposit of 0.2 mg/cm$^2$, for example, and a concentration of 5% BNP in the ink, it is necessary to use 4 mg/cm$^2$ of ink, which represents a layer of about 40 μm.

In a second method, the deposition of ink onto the metal support (2, 3) is carried out by projection of a jet of ink. In this case, the thickness of the deposit is dependent on the concentration of BNP in the ink, the flow rate of the jet, the size of the jet, and sweep rate of the jet.

Typically, but in a non-limiting manner, the width of the jet in the impact zone on the aluminum is 3 mm, and the rate of advance is 10 cm/s. Under these conditions, for a deposit of 0.2 mg/cm$^2$ for example and 5% BNP in the ink, it is necessary to project the ink at a rate of 12 mg/s. The thixotropic aspect of the ink avoids running after projection, on the condition of projecting flat.

In a third method, the deposition of ink onto the metal support (2, 3) is carried out by a deposition method using dipping (dip coating) wherein the metal support (2, 3) is dipped in ink. The ink can, optionally, further comprise a binder intended to promote the adhesion of the BNP on the metal support (2, 3) and/or a thickener intended to adjust the viscosity of the ink.

In a fourth method, a preferred method, the ink is spread with a bar by an apparatus called a bar coater. Said bar coating technique makes it possible to make homogeneous layers of ink of thickness greater than 10 μm to 20 μm. For a deposit of 0.1 mg/cm$^2$ or greater, ink with 5% BNP is suited. Below 0.05 mg/cm$^2$, it is necessary to dilute the ink, which is not too great a nuisance considering the very low content of dispersant that we could obtain. From 0.05 mg/cm$^2$ to 0.1 mg/cm$^2$, ink with 5% is usable, but it is preferable to dilute it slightly because the bar coating technique requires great care.

The next step describing the step of cold pressing the metal support (2, 3) is carried out for the various configurations.

In the first embodiment, the step of cold pressing the metal support (2, 3) with the boron comprising layer (1) is a step of cold pressing the metal support (2, 3) with the BNP and the dispersant left on the metal support (2, 3).

Said cold pressing step is carried out preferably with a rolling mill with two rollers.

An alternative method uses a "rolling pin" type press. In this rolling mill configuration, a roller faces a hard, rigid and flat martyr plate. The roller can move in relation to a fixed martyr plate or, conversely, the martyr plate can move in relation to a fixed roller. The rolling pressure is between 10 MPa and 40 MPa for an aluminum support, for example.

Static pressing is possible but poses practical problems notably because of the very large forces to be applied homogeneously to large surface areas.

The press device, a rolling mill with one or two rollers or a flat press, can also be used advantageously for the step of prepressing the metal support (2, 3).

Said cold pressing step has the effect of fixing the BNP on the metal support (2, 3) and smoothing the surface of the deposit. FIGS. 2a and 2b are photographs illustrating the effect of rolling before rolling (FIG. 2a) and after rolling (FIG. 2b).

The step of cold pressing the metal support (2, 3) with the boron comprising layer (1) is optionally preceded or followed by a step of cooking the metal support (2, 3) in order to evaporate water fixed in the pores of the BNP and to incinerate or calcine the dispersant. Nearly complete drying requires a temperature of 300° C., so as to extract water from the pores of the BNP. The heating necessary to the drying step can be pursued in order to calcine the dispersant mixture under vacuum or under neutral atmosphere or to incinerate the dispersant mixture under air. Free water must necessarily be evaporated, for example at 80° C. under vacuum, before the cold pressing step. Subsequent heating, for additional drying or cooking, can be carried out before or after the cold pressing step. It is carried out preferentially before this step so that degasifications consecutive to thorough drying and cooking do not damage the condition of the surface of the deposited layer. The use of the improved dispersant mixture described above (cationic head+associative polymer) makes unnecessary the step of calcination or incineration by heating beyond 300° C., because of its very low content. With the first dispersants used, comb-shaped polyacrylates, calcination was desirable to reduce the content of additive in the layer of boron. Thermogravimetric analyses showed that the optimum (minimum weight for a given layer of BNP) is obtained for incineration (under air) at 350° C.

Another aim of the invention is a neutron detection apparatus (0) of the proportional gas meter or ionization chamber type.

Said apparatus (0) comprises an enclosure (4) forming a cathode. Said enclosure (4) is filled with gas and comprises a hollow body comprising two main walls (2) having respectively two substantially parallel internal surfaces (21) and each covered by a solid layer (1) of boron or a compound of boron obtained by cold pressing. The lateral walls of the enclosure can also be covered by a solid layer (1) of boron or a compound of boron obtained by cold pressing in order to increase the efficacy of the detection apparatus (0).

The apparatus further comprises a device (5) forming an anode extending inside said enclosure (4).

Optionally, one or more intercalary walls (3) forming a cathode are fixed on said lateral walls (6) and extend inside said enclosure (4) in a manner substantially parallel to the internal surfaces (21) of the hollow body. The or each intercalary wall (3) has two opposite surfaces opposite the respective internal surfaces (21) of said two main walls (2) of the hollow body and are each covered by a solid layer (1) containing boron or a compound of boron deposited by cold pressing. The device (5) forming an anode has at least a part extending into a space between the intercalary wall (3) and one of the internal surfaces (21) of a first main wall (2) of the hollow body and at least one other part extending into another space between the intercalary wall (3) and the other internal surface (21) of the second main wall (2) of the hollow body. The metal supports (2, 3) are the two said main walls (2) whose internal surface (21) is covered by the boron-comprising layer (1) and the two surfaces of the intercalary walls (3).

According to one configuration, the apparatus can comprise several intercalary walls (3), forming a cathode, parallel to each other and to the two internal surfaces (21) of the two main walls (2) and covered by solid layers (1) containing boron or a compound of boron deposited by cold pressing on their two respective opposite surfaces. The device (5) forming an anode has at least a part extending into the space between each main wall (2) and the nearest intercalary wall (3) and at least a part extending into each space between two successive intercalary walls (3).

According to one configuration, the main walls (2) and the lateral walls (6) are rectangular. The lateral walls (6) comprise two first lateral walls and two second lateral walls joining together the main walls (2) so as to define a hollow body in the shape of a parallelepiped hollow plate. The internal surfaces and the intercalary walls (3) are substantially flat and parallel.

According to one configuration, each intercalary wall (3) has at least an opening (35) against or near a lateral wall (6), part of the anode passing through said opening (35).

According to one configuration, the device (5) forming an anode is made all in one piece with the parts of the anode interdependent of each other.

According to one configuration, a first intercalary wall comprises a first opening near or against a first corner at the junction between the first first and second lateral walls, and each intercalary wall adjacent to it comprises a second opening near or against a second corner at the junction between the second first and second lateral walls, the second corner being opposite said first corner, and the anode lead travels through each space between an intercalary wall and a main wall and a space between two adjacent intercalary walls, by passing back-and-forth several times between the two first parallel opposite lateral walls or between the two second opposite lateral walls from a first corner toward a second corner. The anode lead passes from a space between two walls to another by passing through the first and second openings.

Another aim of the invention is a neutron detection device (01) useful for detecting neutrons emitted by a voluminous object (010) such as a barrel of radioactive waste comprising a plurality of detection apparatus (0). The plurality of detection apparatus (0) delimits a large cavity inside which a voluminous object (010) can be disposed. To obtain proper efficacy, the neutron detection device (01) defined by the plurality of apparatus (0) can be inserted in a thick enclosure, for example of a minimum thickness of 10 cm, preferably 15 cm, of hydrogenated material, for example polyethylene or polypropylene. Furthermore, an internal layer of polyethylene or polypropylene of thickness of between 0 cm and 2 cm, for example, installed between the apparatus (0) and the voluminous object (010) can make it possible to optimize the efficacy according to the contents of the barrel (010) and the efficacy sought.

It should be evident to persons skilled in the art that the present invention enables embodiments in many other specific forms without deviating from the field of application of the invention as claimed. Consequently, the present embodiments should be considered for purposes of illustration, but can be modified in the defined field by the scope of the accompanying claims, and the invention should not be limited to the details given above.

What is claimed is:

1. A method of depositing a solid layer (1) of boron on a metal support (2, 3) intended for a neutron detection apparatus (0) or an ionization chamber, wherein the method comprises at least a step of depositing at least one layer (1) comprising boron in the form of nanoparticles onto the metal support (2, 3) and a step of cold pressing the metal support (2, 3) with the boron comprising layer (1), the proportion of boron 10 ($^{10}$B) in the layer (1) deposited onto the metal support (2, 3) being between 80% and 100%.

2. The method as claimed in claim 1, wherein the deposition step is preceded by a step of prepressing the metal support (2, 3).

3. The method as claimed in claim 1, wherein:
the step of depositing at least one boron comprising layer (1) onto the metal support (2, 3) is a step of depositing boron nanoparticle (BNP)-based ink onto the metal support (2, 3); the step of depositing BNP-based ink onto the metal support (2, 3) being followed by a step of drying the metal support (2, 3) onto which ink has been deposited to leave only the BNP and the dispersant on the metal support (2, 3);
the step of cold pressing the metal support (2, 3) is carried out on the metal support (2, 3) with the BNP and the dispersant left on the metal support (2, 3); the step of cold pressing the metal support (2, 3) with the boron-comprising layer (1) being optionally preceded or followed by a step of cooking the metal support (2, 3) in order to evaporate water fixed in the pores of the BNP and to incinerate or calcine the dispersant.

4. The method as claimed in claim 3, wherein the BNP-based ink is manufactured by at least:
a step of manufacturing BNP;
a step of suspending BNP in a solvent containing a dispersant mixture.

5. The method as claimed in claim 4, wherein the concentration of the dispersant mixture in the ink is lower than 0.05%, and the dispersant mixture comprises a cationic polar head and an associative polymer.

6. The method as claimed in claim 3, wherein the concentration of BNP in the ink is lower than 5%.

7. The method as claimed in claim 3, wherein the step of depositing BNP-based ink onto the metal support (2, 3) is carried out with a brush, the thickness of the deposit being dependent on the concentration of BNP in the ink and the quantity of ink, the quantity being defined according to the surface area of the metal support (2, 3) to be covered by the deposition of ink.

8. The method as claimed in claim 3, wherein the step of depositing BNP-based ink onto the metal support (2, 3) is carried out by projecting a jet of ink, the thickness of the deposit being dependent on the concentration of BNP in the ink, the flow rate of the jet, the size of the jet and the relative sweep rate of the jet.

9. The method as claimed in claim 3, wherein the deposition of ink onto the metal support (2, 3) is carried out by a deposition method using dipping wherein the metal support (2, 3) is dipped in ink, the ink optionally comprising a binder intended to promote the adhesion of BNP on the metal support (2, 3) and/or a thickener intended to adjust the viscosity of the ink.

10. The method as claimed in claim 3, wherein the deposition of ink onto the metal support (2, 3) is carried out by a method of spreading with a bar.

11. The method as claimed in claim 1, wherein the step of depositing at least one boron-comprising layer (1) is preceded by a step of cleaning the metal support (2, 3) to remove possible residues.

12. The method as claimed in claim 1, wherein the metal support (2, 3) is an aluminum sheet.

13. A neutron detection apparatus (0) of the proportional gas meter or ionization chamber type wherein the apparatus comprises an enclosure forming a cathode, said enclosure being filled with gas and comprising a hollow body comprising two main walls having respectively two substantially parallel internal surfaces and each covered by a solid layer (1) of boron or a compound of boron, the proportion of boron 10 in the solid layer being in the range of 80% to 100%.

14. The apparatus (0) as claimed in claim 13, wherein the apparatus further comprises a device forming an anode extending inside said enclosure, at least one intercalary wall forming a cathode, fixed on said lateral walls and extending inside said enclosure in a manner substantially parallel to the internal surfaces of the hollow body, the or each intercalary wall having two opposite surfaces opposite the respective internal surfaces of said two main walls of the hollow body and each covered by a solid layer (1) containing boron or a compound of boron, the proportion of boron 10 in the solid layer being in the range of 80% to 100%, and the device forming an anode has at least a part extending into a space between the intercalary wall and one of the internal surfaces of a first main wall of the hollow body and at least one other part extending into another space between the intercalary wall and the other internal surface of the second main wall of the hollow body.

15. A neutron detection device (01) useful for detecting neutrons emitted by a voluminous object (010) such as a barrel of radioactive waste comprising a plurality of detection apparatus (0) as claimed in claim 13, the plurality of the detection apparatus (0) delimiting a large cavity inside which a voluminous object (010) can be disposed.

* * * * *